US010096016B2

(12) United States Patent
Picquenot et al.

(10) Patent No.: US 10,096,016 B2
(45) Date of Patent: Oct. 9, 2018

(54) METHOD OF COMMUNICATING AND TRANSMITTING A MESSAGE RELATING TO A TRANSACTION OF A CONTACTLESS APPLICATION, ASSOCIATED TERMINAL, SECURE MODULE AND SYSTEM

(75) Inventors: David Picquenot, Saint Contest (FR); Laurent Fourreau, Evrecy (FR)

(73) Assignee: Orange, Paris (FR)

( * ) Notice: Subject to any disclaimer, the term of this patent is extended or adjusted under 35 U.S.C. 154(b) by 945 days.

(21) Appl. No.: 12/593,663

(22) PCT Filed: Mar. 28, 2008

(86) PCT No.: PCT/FR2008/050555
§ 371 (c)(1),
(2), (4) Date: Jan. 21, 2010

(87) PCT Pub. No.: WO2008/129225
PCT Pub. Date: Oct. 30, 2008

(65) Prior Publication Data
US 2010/0136913 A1    Jun. 3, 2010

(30) Foreign Application Priority Data
Mar. 30, 2007 (FR) ...................... 07 54194

(51) Int. Cl.
*H04B 5/00*       (2006.01)
*G06Q 20/32*     (2012.01)
(Continued)

(52) U.S. Cl.
CPC .......... *G06Q 20/327* (2013.01); *G06Q 20/04* (2013.01); *G06Q 20/12* (2013.01); *G06Q 20/32* (2013.01);
(Continued)

(58) Field of Classification Search
CPC ........ G06Q 20/04; G06Q 20/12; G06Q 20/32; G06Q 20/322; G06Q 20/327; G06Q 20/352
See application file for complete search history.

(56) References Cited

U.S. PATENT DOCUMENTS

2003/0028435 A1    2/2003   Gaillard
2005/0033688 A1    2/2005   Peart et al.
(Continued)

FOREIGN PATENT DOCUMENTS

WO    WO 00/75885 A1    12/2000

OTHER PUBLICATIONS

Mobile Electronic Transactions LTD, "MeT Core Specification, Version 1.2" published on the internet website http://www.mobiletransaction.org/documents.html (Nov. 12, 2002).
(Continued)

*Primary Examiner* — Zhiyu Lu
(74) *Attorney, Agent, or Firm* — Drinker Biddle & Reath LLP

(57) ABSTRACT

The invention relates to a method of communicating a message relating to a transaction of a contactless application effected between a mobile terminal equipped with a contactless module and equipment, comprising the steps of detecting the end of the transaction between the terminal and the equipment, obtaining a message containing at least information identifying said application and end of transaction information, and communicating said message.

The invention also relates to a method of transmitting such a message including the steps of receiving end detection information, identifying the application associated with the transaction, and determining and transmitting the message to the mobile terminal.

(Continued)

The invention further relates to a mobile terminal and a secure module capable of being used with a mobile terminal.

12 Claims, 3 Drawing Sheets

(51) Int. Cl.
    *G06Q 20/04*      (2012.01)
    *G06Q 20/12*      (2012.01)
    *G06Q 20/34*      (2012.01)
(52) U.S. Cl.
    CPC ......... *G06Q 20/322* (2013.01); *G06Q 20/352* (2013.01)

(56) References Cited

U.S. PATENT DOCUMENTS

| 2005/0156026 | A1  | 7/2005  | Ghosh et al. | |
| 2005/0184165 | A1* | 8/2005  | de Jong ........................ | 235/492 |
| 2005/0251454 | A1  | 11/2005 | Wood | |
| 2006/0044153 | A1* | 3/2006  | Dawidowsky ........... | 340/825.22 |
| 2007/0022058 | A1* | 1/2007  | Labrou et al. .................. | 705/67 |
| 2007/0101122 | A1* | 5/2007  | Guo ....................... | H04L 63/061 |
|              |     |         |                           | 713/153 |
| 2008/0162312 | A1* | 7/2008  | Sklovsky ............... | G06Q 20/32 |
|              |     |         |                           | 705/35 |
| 2008/0162361 | A1* | 7/2008  | Sklovsky et al. ............... | 705/65 |
| 2008/0174405 | A1* | 7/2008  | Toorn .......................... | 340/10.1 |

OTHER PUBLICATIONS

Mobile Electronic Transactions LTD, "MeT Ticketing Specification, Version 1.0", published on the internet website http://www.mobiletransaction.org/documents.html (Nov. 22, 2002).

European Telecommunications Standards Institute (ETSI), "GSM Digital cellular telecommunications system (Phase 2+); Specification of the SIM Application Toolkit for the Subscriber Identity Module—Mobile Equipment (SIM-ME) interface (GSM 11.14 version 5.4.0)," ETSI Publication, pp. 1-56 (Jul. 1997).

* cited by examiner

METHOD OF COMMUNICATING AND TRANSMITTING A MESSAGE RELATING TO A TRANSACTION OF A CONTACTLESS APPLICATION, ASSOCIATED TERMINAL, SECURE MODULE AND SYSTEM

CROSS-REFERENCE TO RELATED APPLICATIONS

This application is the U.S. national phase of the International Patent Application No. PCT/FR2008/050555 filed Mar. 28, 2008, which claims the benefit of French Application No. 07 54194 filed Mar. 30, 2007, the entire content of which is incorporated herein by reference.

FIELD OF THE INVENTION

The present invention relates to telecommunications, and more particularly to managing applications of a mobile terminal.

BACKGROUND OF THE INVENTION

Most mobile terminals can be used not only to set up telephone calls but also to execute a plurality of applications downloaded into a secure module of the terminal. That secure module can be a memory module of the terminal or a removable medium (for example a universal integrated circuit card (UICC)) inserted into the terminal. Some mobile terminals are also equipped with a specific "contactless" module enabling the terminal to dialogue with and/or effect contactless transactions with stations known as "contactless stations". To be more precise, this module is used for bidirectional transfer of data between a contactless station and a downloaded application. One example of such an application is one in the public transport field in which passing the mobile terminal in front of a station validates access by the user to a transportation system.

The downloaded application being a slave application controlled by the contactless station, the end of the transaction is not easily identifiable by the mobile terminal and it is therefore difficult for the terminal to inform the user of the terminal of the result of the transaction. The method used at present configures the mobile terminal so that it interrogates the various applications installed at regular intervals; the applications send back information if a transaction has taken place. Interrogation by the mobile terminal and the transaction being two processes that are not correlated, the display delay after a transaction is not fully under control and the display is not effected in real time. This display delay can be reduced by increasing the number of interrogations, but this gives rise to problems of electrical power consumption if the applications are installed on a removable secure module inserted in the terminal, because that module must be supplied with electrical power for each interrogation.

SUMMARY OF THE INVENTION

The present invention alleviates this problem by proposing a solution that informs the mobile terminal user in real time of the result of a contactless transaction.

To this end, the present invention proposes a method of communicating a message concerning a transaction of a contactless application effected between a mobile terminal equipped with a contactless module and an equipment, said transaction being initialized by said equipment, the method including the following steps:

detecting the end of a transaction between the terminal and the equipment;
obtaining a message containing information identifying said application and end of transaction information; and
communicating said message.

Thus the method of the invention enables the mobile terminal user to be informed by the mobile terminal of the result of a transaction as soon as it is completed. Moreover, the information message enables the user to tell which application effected the transaction. This information is particularly useful if there is more than one application installed on the mobile terminal.

In one implementation of the invention, the application is stored in a secure module of the mobile terminal and the step of obtaining the message includes a step of sending end of transaction detection information to the secure module and a step of receiving said message and a man-machine interface command. Thus information concerning an application is managed by a single entity, the secure module. This enhances the security of the application.

In one implementation, the end of transaction detection information contains an identifier corresponding to the application associated with the transaction. This identifier is either stored during the transaction or transmitted by the application to the contactless module at the end of the transaction. At the end of the transaction, this identifier identifies which of all the applications stored in the mobile terminal is linked to the transaction that has just been effected.

In one implementation, the secure module is a subscriber card inserted in said terminal.

In one implementation of the invention, the end of transaction information includes data of the application updated after execution of the transaction. Thus the user of the mobile terminal is informed of modifications occurring during the transaction.

At the end of the transaction, the message produced by the method of the invention is transmitted to the mobile terminal user via a man-machine interface of the terminal. In one implementation, the communication step is a step of displaying said message on a screen of the mobile terminal and/or a step of reproducing a voice message containing said message by a loudspeaker of the mobile terminal.

The invention also provides a method of transmitting a message concerning a transaction of a contactless application effected between a mobile terminal equipped with a contactless module and an equipment, said transaction being initialized by said equipment, the method including the following steps:

receiving end of transaction detection information;
identifying the application associated with the transaction;
determining said message including information identifying said application and end of transaction information; and
transmitting said message to the mobile terminal.

In one implementation, the identification step includes a step of reading an identifier stored during said transaction. In one implementation, the identifier is stored in a memory of the secure module during the transaction and the identification step includes a step of reading the identifier in that memory. In another implementation, the identifier is stored in a memory of the contactless module during the transaction and inserted into the end of transaction detection information transmitted to the secure module by the contactless module. These implementations have the advantage of requiring no modification of the application.

In another implementation, the end of transaction detection information contains an address of a program linked to the application, the application supplying this address to the contactless module at the end of the transaction. Thus it is not necessary to store an identifier during the transaction. "Contactless" transactions are always effected in a very short time and inserting an additional storage command during the transaction can compromise correct execution of the transaction. This implementation avoids this kind of problem.

The invention also provides a mobile terminal including a contactless communications module, means for detecting the end of a transaction, means for obtaining a message containing information identifying said application and end of transaction information, and man-machine interface means for communicating said message to the mobile terminal user.

The invention also provides a secure module including:

means for receiving end of transaction detection information;

means for identifying the application associated with the transaction;

means for determining a message containing information identifying said application and end of transaction information; and means for transmitting said message and a man-machine interface command to the mobile terminal.

In one embodiment, the secure module further includes means for storing an identifier corresponding to said application associated with the transaction that is stored during the transaction.

The invention also provides a system comprising a mobile terminal of the invention and a secure module of the invention inserted in said terminal.

The invention also provides a computer program product including instructions for executing the steps of the transmission method of the invention when it is loaded and executed by a processor of the secure module.

BRIEF DESCRIPTION OF THE DRAWINGS

Other features and advantages of the present invention become apparent in the course of the following description of an implementation given by way of non-limiting example and with reference to the appended drawings, in which.

DETAILED DESCRIPTION

Figure 1:
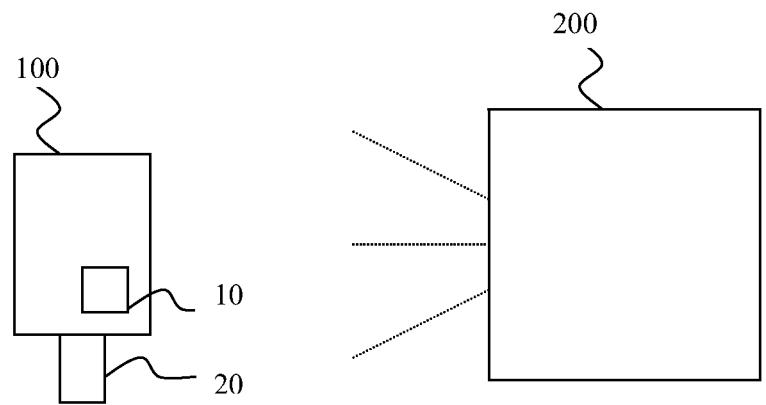
FIG. 1 is a diagram showing the context of the invention.

An implementation of the invention in which a user has a mobile terminal 100 on which a plurality of applications have been installed is described below with reference to FIG. 1. This mobile terminal is a mobile telephone, for example, or a personal digital assistant (PDA). The mobile terminal 100 includes a contactless communications module 10 enabling dialogue between the terminal 100 and an equipment 200 referred to below as a "contactless station".

The contactless module is an NFC (near field communication) compatible module, for example.

The mobile terminal 100 also includes a secure module 20 in the form of a universal integrated circuit card (UICC) subscriber card. Alternatively, this module can be a secure memory area of the mobile terminal or a removable medium of some other type (for example a SIM subscriber card or a memory card (SD card, embedded secure controller card, etc.)).

One or more applications (AP1, AP2, etc.) are stored in the memory of the subscriber card. One or more of these applications are contactless applications and use the contactless module 10. One such application is an application for controlling access to a public transport system, for example. That application will then be used each time that the mobile terminal user wants to use the public transport system. On each use, a dialogue between the application stored on the subscriber card 20 and a contactless station 200 installed at the entry of the transport system enables the station to verify that the mobile terminal user is authorized to use the transport system. For example, this dialogue verifies that the mobile terminal user has a valid subscription for the transport system or decrements a number of tickets stored in the subscriber card. This dialogue between the subscriber card 20 and the contactless station 200 is effected via the contactless module 10.

Figure 2:
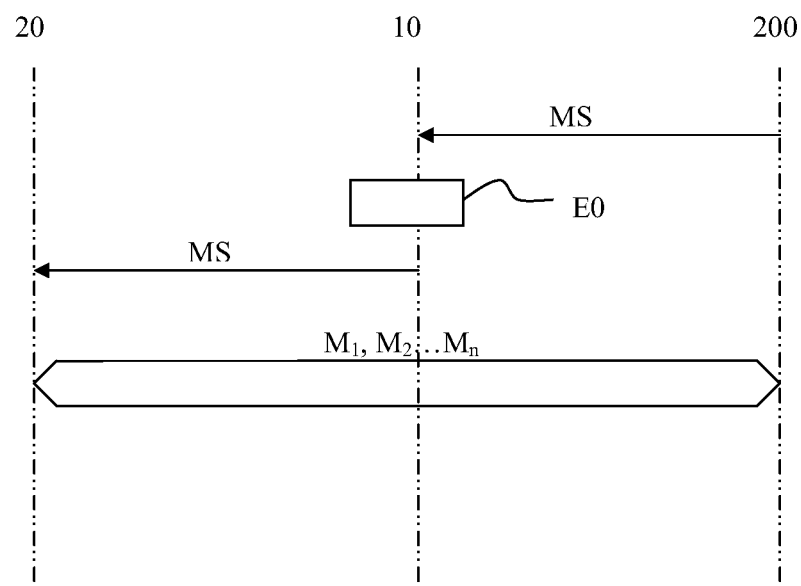
FIG. 2 is a diagram showing messages exchanged during a contactless transaction.

In a manner that is known in the art, the contactless terminal 200 emits a magnetic field. When the mobile terminal user arrives at the entry of the transport system, his mobile terminal enters the magnetic field emitted by the station 200. A transaction is then effected between the selected application on the subscriber card of the mobile terminal and the station 200. To be more precise, as shown in FIG. 2, when the mobile terminal enters the magnetic field of the contactless station, the contactless module receives from the contactless station a selection message MS (select AID) containing the identifier AID1 of an application AP1 and forwards it to the subscriber card. On reception of this message MS, the subscriber card commands execution of the selected application AP1. Messages are exchanged between the contactless module and the subscriber card in a standard manner, for example using the single wire protocol (SWP) or the SigIn-SigOut-Connection ($S^2C$) interface. Depending on the selected application, messages (M1, M2, . . . , Mn) are then exchanged between the application and the contactless station.

In the implementation described, after receiving the selection message and before commanding execution of the application, during a step E0, the subscriber card stores in a temporary memory T of the subscriber card 20 the identifier AID1 of the selected application AP1. Alternatively, the identifier can be stored after sending the command to execute the application or during the transaction.

Figure 3:
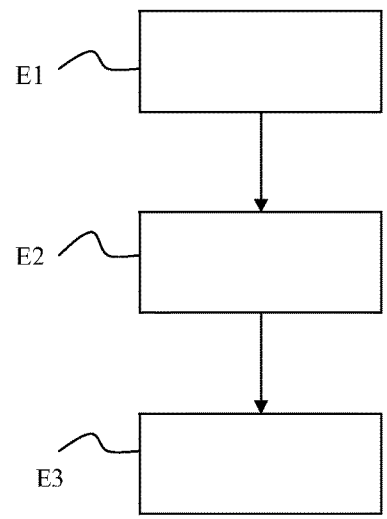
FIG. 3 is a diagram showing the steps of the method of the invention.

The principal steps of the method of the invention are described below with reference to FIG. 3. These steps follow on from the exchange of messages (M1, M2, . . . , Mn). During a step E1, the contactless module detects the end of the transaction. The end of the transaction is brought about by breaking the magnetic field between the station and the terminal, by the terminal no longer being present in the field emitted by the station, or possibly because the station is no longer emitting the field. To be more precise, this break is detected by a trigger added to or integrated into the contactless module.

Alternatively, the magnetic field emitted by the station is maintained and the end of the transaction is detected by the contactless module receiving an end of transaction message sent by the station (for example an ISO 14443-3 Disconnect or Deselect message).

The step E1 is followed by a step E2 of obtaining a message containing at least information identifying the selected application and end of transaction information.

The message obtained is then communicated to the mobile terminal user via the screen of the mobile terminal during a step E3. Alternatively, communication can be effected via the loudspeaker of the terminal.

Figure 4:
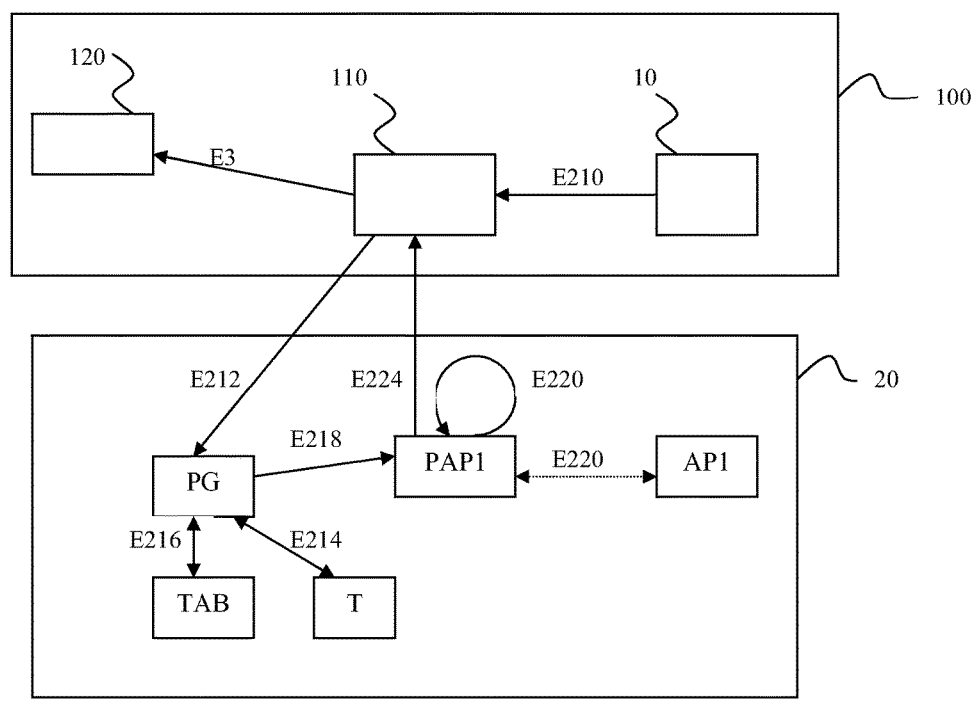
FIG. 4 is a diagram showing the steps of a method conforming to a first implementation of the invention.

The step E2 in a first implementation is described in more detail below with reference to FIG. 4.

In this implementation, the mobile terminal is equipped with a web browser 110. This browser provides access to web pages stored in the subscriber card. The subscriber card hosts an HTTP server. The technology used is the smart card web server (SCWS) technology currently being standardized by the OMA (Open Mobile Alliance) of the OMA SEC-Smart Card Technology (SEC-SCT) working subgroup, for example. That technology enables the mobile terminal to launch an application stored in the subscriber card from a web browser.

During a first substep E210, following detection of the end of the transaction, the contactless communications module 10 sends the web browser of the mobile terminal end of transaction detection information. That information is a command to launch the web browser of the mobile terminal. It contains as a parameter the address of a program PG on the subscriber card. This command and this address are stored beforehand in the contactless module 10. During the next step E212, on reception of this information, and via the SCWS, the browser redirects the command to the subscriber card, thereby enabling launching of the program PG. To be more precise, the address of the program PG is a URL corresponding to a program PG on the subscriber card common to all the applications. In a substep E214, the subscriber card proceeds to read the identifier AID1 stored during the transaction in the temporary memory T. For example, it can be stored in an elementary file (EF). In a substep E216, the address of a second program PAP1 linked to the application AP1 is determined by reading a correspondence table TAB linking each application identifier to a subroutine address. That address is also an URL. During a substep E218, a redirection command enables execution of the program stored from the address PAP1. This program is specific to the selected application.

In a step E220, this program determines the message addressed to the terminal user. That message contains information enabling the user to identify the application that has just been used. This information stored in the program PAP1 is information in text form, for example "Caen bus". The message also contains end of transaction information. The end of transaction information is, for example, information stored in the program in text form, for example "transaction completed". In another implementation, the end of transaction message can contain information for updating the application. To obtain that information, the program PAP1 interrogates the application AP1 linked to that program that in return supplies it with the requested information. For example, the program PAP1 obtains the number of bus tickets purchased by the user not yet used. The information obtained is then inserted into a text message by the program PAP1. For example, the end of transaction information is "transaction completed—you still have 9 tickets". Alternatively, the end of transaction information can indicate that the transaction has been completed implicitly; for example, the end of transaction information can be: "you still have 9 tickets". The information identifying the application and the end of transaction information are then inserted into the same message.

During a step E224, the message is transmitted with a display command to the web browser 110 of the mobile terminal. In the implementation described here, the display command and the message to be displayed are transmitted in an XHTML page.

During the next step E3, the web browser commands the man-machine interface 120 of the mobile terminal in the conventional way to display the message on the screen of the mobile terminal.

Alternatively, the identifier of the application stored during the step E0 is not stored in the subscriber card but in a memory of the contactless module. It is then transmitted as a parameter with the address of the program PG during steps E210 and E212, and the step E214 of reading the identifier in memory is replaced by a step of the subscriber card receiving that identifier.

Figure 5:
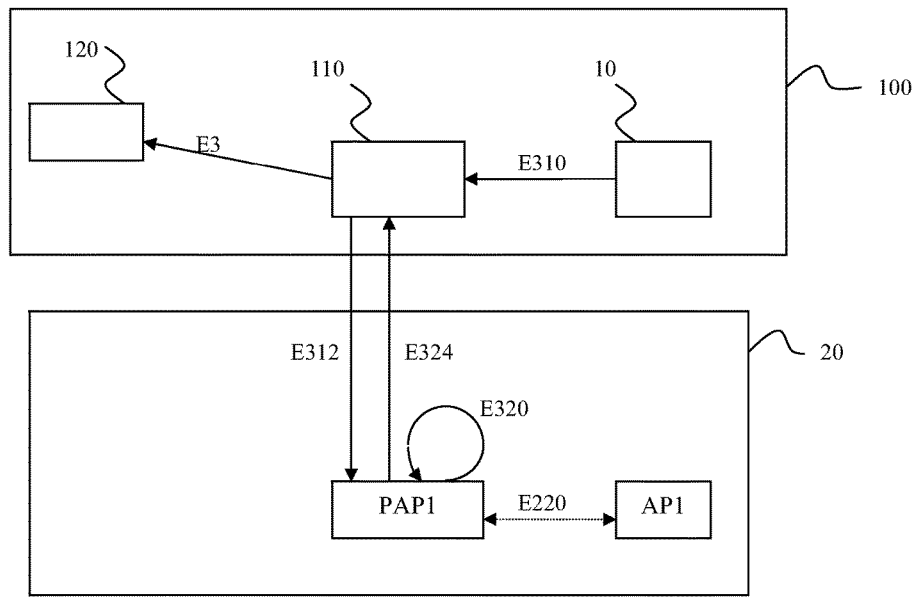
FIG. 5 is a diagram showing the steps of a method conforming to a second implementation of the invention.

A second implementation is described below with reference to FIG. 5. In this implementation, the identifier AID1 of the application AP1 is not stored during the transaction and the steps E1 and E3 are identical to those of the first implementation described.

During the step E2, following detection of the end of the transaction, the contactless module sends the web browser 110 of the mobile terminal end of transaction detection information during a step E310. That information is a command to launch the web browser of the mobile terminal. It contains a parameter in the form of the address of a program PAP1 on the subscriber card. The command to launch the browser is either stored in the contactless module or transmitted to it by the application AP1 with the address of the program PAP1. The address of the program PAP1, which is the address of an application linked to the selected application AP1, is supplied by the application AP1 to the contactless module at the end of the transaction following the reception by the subscriber card of a command transmitted by the contactless module. To be more precise, and by way of example, following detection of the end of the transaction, the contactless module transmits a "Deselect Event" instruction to the receiver module of the subscriber card (SWP handler), which sends a "Deselect APDU" command to the application AP1. Following reception of that command, the application AP1 sends the contactless module the address PAP1.

On reception of the end of transaction detection information, during a step E312, and via the SCWS, the browser gets the card to execute the program PAP1. To be more precise, the address of the program PAP1 is a URL corresponding to a program on the subscriber card specific to the selected application.

This step is followed by steps E320 and E324 similar to the steps E220 and E224 of the first implementation.

In both the implementations described above, the secure module is a subscriber card 20 and dialogue between the mobile terminal and the subscriber card uses a web browser. Alternatively, and in particular if the secure module is a memory area of the mobile terminal, the dialogue is effected, in a manner known in the art, via the interface between the contactless module and the principal module of the mobile terminal (NFC chip-digital base band interface). Accordingly, at the end of the transaction, a Launch command launches the program (PG, PAP1). If the applications are Java applications, then the API JSR 251 is used, for example, and the "PushRegistry" function defined in the MIDP (mobile information device profile) specifications is used to awake/launch the application PAP1.

Figure 6:
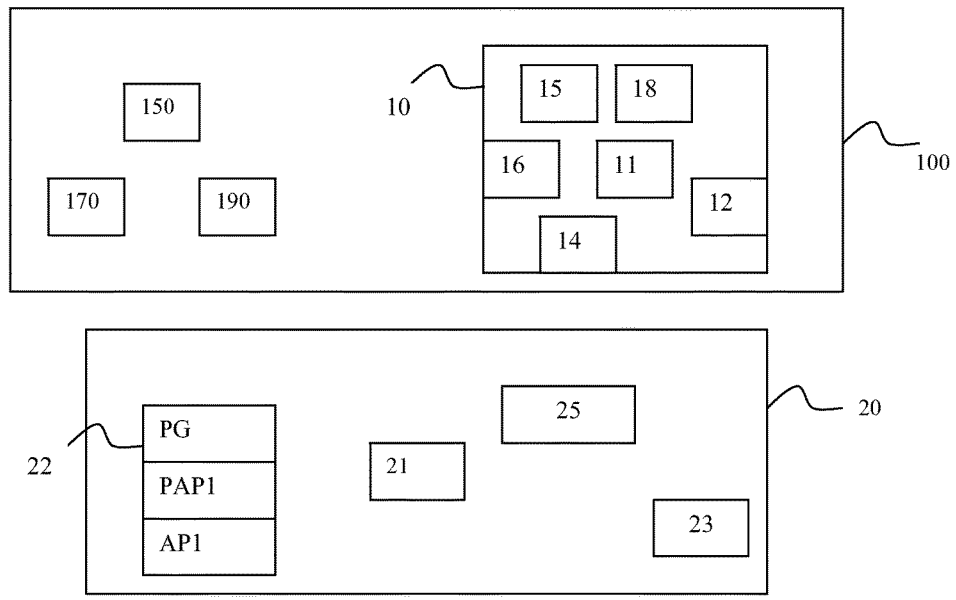
FIG. 6 is a block diagram representing a system conforming to one implementation of the invention.

In a selected implementation represented in FIG. 6, a system implementing the invention consists of a mobile terminal 100 and a subscriber card 20, for example.

The mobile terminal 100 includes, in the manner known in the art, a processor unit 150 equipped with a microprocessor, a read-only memory (ROM) 170, and a random-access memory (RAM) 190. The mobile terminal 100 includes a contactless module 10 and can conventionally and non-exhaustively includes: a keyboard, a screen, a microphone, a loudspeaker, a communications interface, storage means, etc. The read-only memory 170 includes registers storing a computer program including program instructions adapted both firstly to receive command instructions coming from the contactless module and to forward them to the subscriber card 20 and also to receive man-machine interface commands from the subscriber card and to execute them.

The contactless communications module 10 includes, in the manner known in the art, a microprocessor 11, a send-receive module 12 for communicating with the contactless station 200, a send-receive module 14 for communicating with the application in the secure module, a send-receive module 16 for communicating with the mobile terminal, and a memory 15. It further includes a trigger 18. If the trigger 18 detects interruption of the magnetic field or the module 16 receives a disconnection message sent by the station 200, the microprocessor 11 causes the end of transaction detection information to be sent to the mobile terminal.

The system also includes a secure module 20. This secure module 20 is, for example, a subscriber card that includes, in the manner known in the art, a processor unit 21 equipped with a microprocessor, a read-only memory (ROM) 22, a random-access memory (RAM) 23, a send-receive module 25 for communicating with the mobile 100 and the contactless module 10. The read-only memory 22 includes registers storing one or more computer programs including program instructions adapted to execute one or more applications (AP1, AP2, etc.). It also includes registers storing a computer program including program instructions adapted to execute a method of the invention of transmitting a message as described with reference to FIGS. 3 to 5. That program is thus adapted to receive end of transaction detection information from an application, to determine a message containing information identifying the application and end of transaction information, and transmitting the message so determined to the mobile terminal.

On the detection of the end of a transaction by the contactless module, the mobile terminal sends end of transaction information to the subscriber card and the program (PG, PAP1) stored in the read-only memory 21 is transferred into the random-access memory, which then contains the executable code of the invention and registers for storing the variables necessary for implementing the invention.

We claim:

1. A method of communicating a message concerning a transaction of a contactless application effected between an equipment and a mobile terminal the mobile terminal comprising a processing unit, a contactless module, a secure module, and a man-machine interface, said method comprising the following steps:
    the mobile terminal entering a magnetic field emitted by the equipment;
    the contactless module receiving, from the equipment, a selection message containing an identifier of the contactless application;
    the contactless module forwarding the selection message to the secure module;
    the secure module launching the contactless application;
    the contactless module detecting the end of a transaction between the mobile terminal and the equipment;
    upon detecting the end of the transaction, the contactless module sending end of transaction detection information to the processing unit;
    upon reception of the end of transaction detection information, the processing unit sending execution information to the secure module, said execution information enabling execution of a program on the secure module, said program being specific to said contactless application;
    upon reception of the execution information, the secure module
        executing said program to insert information identifying said contactless application and end of transaction information into a message;
        transmitting said message and a man-machine interface command to the processing unit; and
    the processing unit communicating said message on the man-machine interface in accordance with the man-machine interface command.

2. A method according to claim 1, wherein the end of transaction detection information contains an identifier corresponding to said contactless application associated with the transaction.

3. A method according to claim 1, in which the secure module is a subscriber card inserted in said terminal.

4. A method according to claim 1, wherein the end of transaction information includes data of the contactless application updated after execution of the transaction.

5. A method according to claim 1, wherein the communicating step comprises displaying said message on a screen of the mobile terminal and/or a step of reproducing a voice message containing said message by a loudspeaker of the mobile terminal.

6. A method according to claim 1, wherein the information identifying said contactless application comprises an identifier stored during said transaction.

7. A mobile terminal including a processing unit, a contactless communications module, a secure module, and a man-machine interface,
    the mobile terminal configured to:
        enter a magnetic field emitted by an equipment;
    the contactless communications module configured to
        receive a selection message containing an identifier of a contactless application from the equipment;
        forward the message to the secure module;
        detect the end of a transaction;
        upon detecting the end of a transaction between the terminal and the equipment, send end of transaction detection information to the processing unit;
    the processing unit configured to, upon reception of the end of transaction detection information, send execution information to the secure-module, said execution information enabling execution of a program on the secure module, said program being specific to said contactless application;
    the secure module configured to, upon reception of the execution information,
        execute said program to insert information identifying said contactless application and end of transaction information into a message;
        transmit said message and a man-machine interface command to the processing unit; and the processing unit further configured to communicate said message on the man-machine interface in accordance with the man-machine interface command.

8. A mobile terminal according to claim 7, wherein the secure module or the contactless communication module is further configured to store the identifier corresponding to said contactless application associated with the transaction during the transaction.

9. A system comprising a mobile terminal including a processing unit, a contactless communications module, a secure module, and a man-machine interface, the mobile terminal configured to:
  enter a magnetic field emitted by an equipment;
  the contactless module being configured to:
    receive a selection message containing an identifier of a contactless application from the equipment;
    forward the selection message to the secure module;
    upon detecting the end of a transaction between the terminal and the equipment, send end of transaction detection information to the processing unit;
  the processing unit being configured to, upon reception of the end of transaction detection information, send execution information to the secure-module, said execution information enabling execution of a program on the secure module, said program being specific to said contactless application;
  the secure module being configured to:
    upon reception of the selection message, launch said contactless application;
    upon reception of the end of transaction detection information, identify the contactless application associated with the transaction;
    execute said program specific to said contactless application;
    determine by said program a message containing information identifying said application and end of transaction information; and
    transmit said message and a man-machine interface command to the processing unit,
  said secure module being inserted in said terminal,
  the processing unit being further configured to communicate said message on the man-machine interface in accordance with the man-machine interface command.

10. A non-transitory computer readable medium having stored thereon instructions for executing the steps of the method according to claim 1.

11. A method according to claim 1, wherein the contactless application is a slave application controlled by the equipment.

12. A method according to claim 1, wherein the contactless module is a contactless communication module and wherein detecting the end of a transaction comprises the contactless communication module receiving an end of transaction message from the equipment.

* * * * *